United States Patent
Matsushita

[11] Patent Number: 5,872,954
[45] Date of Patent: Feb. 16, 1999

[54] METHOD OF MONITORING REGISTERS DURING EMULATION

[75] Inventor: Yoshinori Matsushita, Tokyo-to, Japan

[73] Assignee: Texas Instruments Incorporated, Dallas, Tex.

[21] Appl. No.: 548,357

[22] Filed: Nov. 1, 1995

[30] Foreign Application Priority Data

Nov. 1, 1994 [JP] Japan ................................... 6-292347

[51] Int. Cl.⁶ ............................. G06F 9/455; G06F 11/30
[52] U.S. Cl. ........................................................ 395/500
[58] Field of Search ..................................... 395/500, 527

[56] References Cited

U.S. PATENT DOCUMENTS

| | | |
|---|---|---|
| 4,674,089 | 6/1987 | Poret et al. ............................... 395/500 |
| 5,032,783 | 7/1991 | Hwang et al. ......................... 324/73.1 |
| 5,329,471 | 7/1994 | Swoboda et al. ......................... 364/578 |
| 5,497,456 | 3/1996 | Alexander et al. ................ 395/183.05 |
| 5,657,328 | 8/1997 | Swoboda ................................. 371/32.3 |

*Primary Examiner*—Kevin J. Teska
*Assistant Examiner*—Ayni Mohamed
*Attorney, Agent, or Firm*—William B. Kempler; Richard L. Donaldson

[57] ABSTRACT

A method for reading various registers of a computer system without changing the emulator software. Address register 22, data memory I/O 30 and control register 26 surrounding D-MEM (data memory) 14 are configured as registers of a master/slave latching circuit in which serial scanning is possible, and are sequentially scanned during one scanning pass (1). Data memory I/O register 30 is connected to D-BUS (data bus) 10. External I/O registers RG1, RG2, . . . RGn are respectively connected to D-BUS (data bus) 10 and mapped in the I/O space. An IN'/OUT' instruction which can transfer data between data memory I/O register 30 and each external I/O register RG1 (i=1, 2, . . . , n) is generated.

3 Claims, 5 Drawing Sheets

METHOD OF MONITORING REGISTERS DURING EMULATION

FIELD OF THE INVENTION

The present invention relates to a method for monitoring the registers within a computer system during emulation.

BACKGROUND OF THE INVENTION

An in-circuit emulator is used for testing or debugging software for a computer system, such as a microcomputer, or for checking hardware operation. The target system software or hardware is checked or debugged by running a program (target program) in the computer system which becomes the emulation target (target system), by detecting the pattern of arbitrary execution information with a trace function during the execution, or by checking the state of each part within the system by interrupting the target program at break points with a break function.

Many emulators read out the contents or information in the main registers (e.g., accumulator or memory I/O register, etc.) within the target system by a scanning pass system to check the state of each part within the system at the break point.

A scanning pass system will be explained with reference to FIGS. 4–6. In FIG. 4, target system 100 is, for example, a microprocessor or DSP (digital signal processor) with various registers. Of the various registers, the registers of the main parts of the system, for example, the registers of the address system, the registers of the control system, and registers (I/O register) of the data system which reads or writes data by specifying a register name together with a program instruction, such as the memory I/O register or accumulator register, etc., are scanned during scanning passes (1), (2), (3), . . .

The structure of a register scanned during a scanning pass is shown in FIG. 5. As one possible example, the register has 4 bit positions. Each bit element of this type of register is composed of a master/slave latch circuit (flip-flops) FF0–FF3 in which serial scanning is possible as shown in FIG. 6.

In FIG. 6, flip-flop FFi in each step (digit) is composed of slave latch circuit LS which holds the data and master latch circuit LM which receives the data.

In the regular mode, determination of input data in master latch circuit LM and change in the output data in slave latch circuit LS are executed by synchronizing with phase shifted master clock MCLOCK and slave clock SCLOCK provided respectively to input gate circuits GM and GS. Therefore, while data is being input to master latch circuit LM, slave latch circuit LS holds and outputs the data of the previous cycle, receives the data from the master side at the data input port (gate circuit GS) of slave latch circuit LS which opens simultaneously with the closing of data input port (gate circuit GM) of master latch circuit LM, and the output data is updated. In the regular mode, the other (scan use) input gate circuit GT of master latch circuit LM is closed. Therefore, the register in FIG. 6 operates as a parallel in/parallel out type register.

During the scanning pass mode, feeding of master clock MCLOCK stops, gate circuit GM closes, and instead test clock TCLOCK is fed to gate circuit GT. Thus, data from the scan in input terminal is input to master latch circuit LM by synchronizing with test clock TCLOCK, then this data is input to slave latch circuit LS by synchronizing with slave clock SCLOCK, and is output to flip-flop (FFi+1) in the next step. In this way, the register in FIG. 6 operates as a serial in/serial out type register in the scanning pass mode.

As noted above, each register connected to the scanning bus is formed to input and output the data in parallel in the regular mode and to serially input and output the data in the scanning pass mode.

Generally, multiple scanning passes are provided within one computer system and one or more registers are connected in series on each scanning pass. For example, in target system 100 shown in FIG. 4, two registers RA1 and RA2 are connected in series on first scanning pass (1), three registers RB1, RB2, and RB3 are connected in series on second scanning pass (2), and two registers RC1 and RC2 are connected in series on third scanning pass (3). Both terminals of each scanning pass (1), (2), (3), . . . are connected to emulator 110 via data input/output terminals 106 and 108 and multiplexers 102 and 104. The number and arrangement of the registers and scanning passes shown in FIG. 4 are just one example, which is used for the sake of explanation.

When the program in target system 100 is stopped at a prescribed break point in the emulation, information expressing the system state at this point in time is held in registers RA1, RA2, . . . Emulator 110 successively selects scanning passes (1), (2), (3), . . . by switching mutliplexers 102 and 104, feeds test clock pulse TCLOCK and slave clock pulse SCLOCK to each register on the selected scanning pass, then sequentially reads the contents of each register to the outside of target system 100, then latches the contents by moving serially during the scanning pass. Emulator 110 knows ahead of time the order of the registers during each scanning pass, so that a series of serial data included with each scanning pass is separated for each register and the content (information) of each register is displayed on the screen of display 112 at the break point.

In the custom design of a computer system, the main part of the system is designed by the manufacturer as the core and the remainder is left to the customer. In this case, each register within the core is scanned during one of the scanning passes as described above. On the other hand, there are times when the customer uses register RX outside the core as one of the system elements (FIG. 4) and desires to monitor the register contents during emulation. Normally, multiple I/O registers are prepared outside the core and are selected by the customer.

Conventionally, when there was such a specification request from the customer, selected I/O register Rx outside the core was scanned during one of the scanning passes, and during the emulation, the contents of the register Rx were read by sequentially scanning during the scanning pass which includes the core register.

However, when register Rx outside the core is included in the scanning pass, in addition to the requirement of making even this register Rx into a register composed of a master/slave type latch circuit which can be serially scanned, the software on the emulator 110 side must be changed since the layout and the arrangement pattern of the register change during the scanning pass which includes the register Rx. Moreover, the register arrangement pattern changes arbitrarily during one of the scanning passes for each request specified by the customer, so that there was the problem of changing or developing emulator software each time; thus, the design efficiency was low.

The present invention was conceived in light of the problems, and it aims to provide a method which can read various registers within a computer system being emulated without changing the emulator software.

Another objective of the present invention is to provide a method which can read or write from an emulator with respect to a register not included in the scanning pass within the computer system.

SUMMARY OF THE INVENTION

To achieve the objective, the first register monitoring method during emulation according to the present invention is a method in which along with previously connecting in series one or more given registers of a computer system to be emulated to an emulator during a scanning pass, a first data transfer instruction is set for transferring data from a given second register not included in the scanning pass to a given first register which is included in the scanning pass, wherein while the program of the computer system is suspended, the emulator sequentially scans and reads the contents of the register during the scanning pass, makes the computer system execute the first data transfer instruction and transfers the contents of the second register to the first register, and then sequentially reads the contents through the scanning pass.

The second register monitoring method during emulation according to the present invention is a method in which along with previously connecting in series one or more given registers of a computer system to be emulated to an emulator during a scanning pass, a second data transfer instruction is set for transferring data to a given second register not included in the scanning pass from the first register which is included in the scanning pass, wherein while the program of the computer system is suspended, the emulator sequentially reads the contents of the register during the scanning pass, transfers the necessary data to the first register via the scanning pass, then makes the computer system transfer the contents of the first register to the second register by executing the second data transfer instruction.

Also, the third register monitoring method during emulation according to the present invention is a method in which in the first or second method, the instruction register for providing instructions to be executed within the computer system to the program execution controlling circuit is connected during one of the scanning passes, and the emulator is made to provide the first or second data transfer instruction to the instruction register via the scanning pass.

In the first register monitoring method during emulation, when execution of the target program stops at the break point, etc., the emulator first of all successively scans and reads the register during each scanning pass. Next, the emulator transmits the code of the first data transfer instruction to the instruction register during one of the scanning passes, for example, by scanning and making the computer system execute the transfer instruction. Thus, the contents of the second register which is not included in the scanning passes is transferred to the first register during a prescribed scanning pass. Next, the emulator reads the contents of the first register from the computer system during the scanning pass.

In the second register monitoring method during emulation, when the execution of the target program stops at the break point, etc., the emulator first successively scans and reads the register with each scanning pass. Next, the emulator scans the first register and the necessary data to be written in the second register is transferred to the first register. Then, the emulator transfers the code of the second data transfer instruction to the instruction register during one of the scanning passes, for example, by scanning and making the computer system execute the transfer instruction. Thus, the contents of the first register, i.e., the necessary data from the emulator is transferred to the second register.

In the figures, 10 is a D-BUS (data bus), 12 a C-BUS (data bus), 14 a D-MEM (data memory), 16 a C-MEM (coefficient memory), 18 an ALU (arithmetic logic unit), 20 a MAC (sum of products computer), 30 a data memory I/O register, 32 a coefficient memory I/O register, 40 a P-MEM (program memory), 46 a program memory I/O register, 48 an instruction register, 50 a PLA, 52 a PLA output register, and RG1–RGn are external I/O registers.

DETAILED DESCRIPTION

Figure 1:
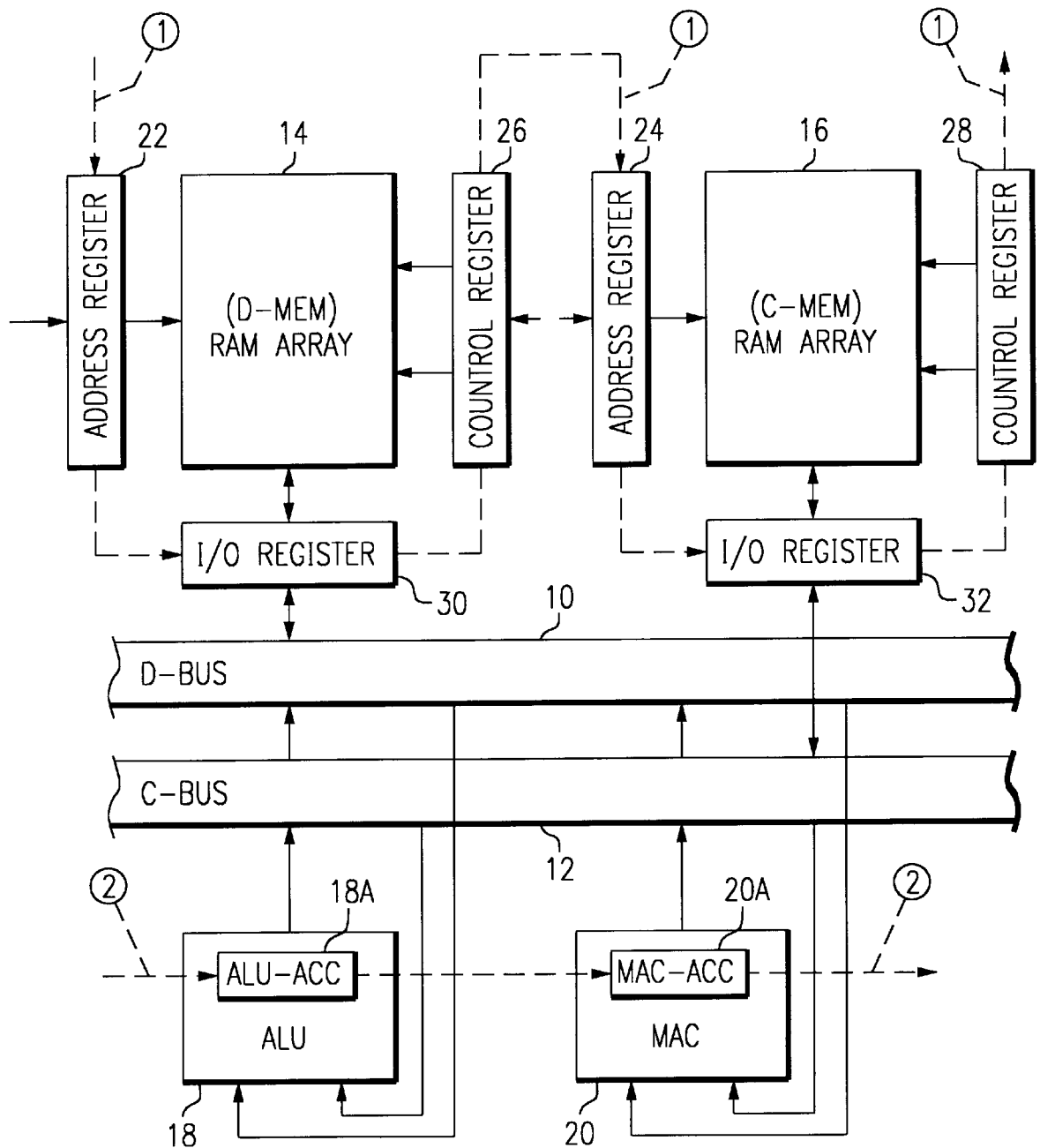
FIG. 1 is a block diagram showing the structure of the data storage part and arithmetic part of a DSP which is emulated in one embodiment of the present invention.
Figure 2:
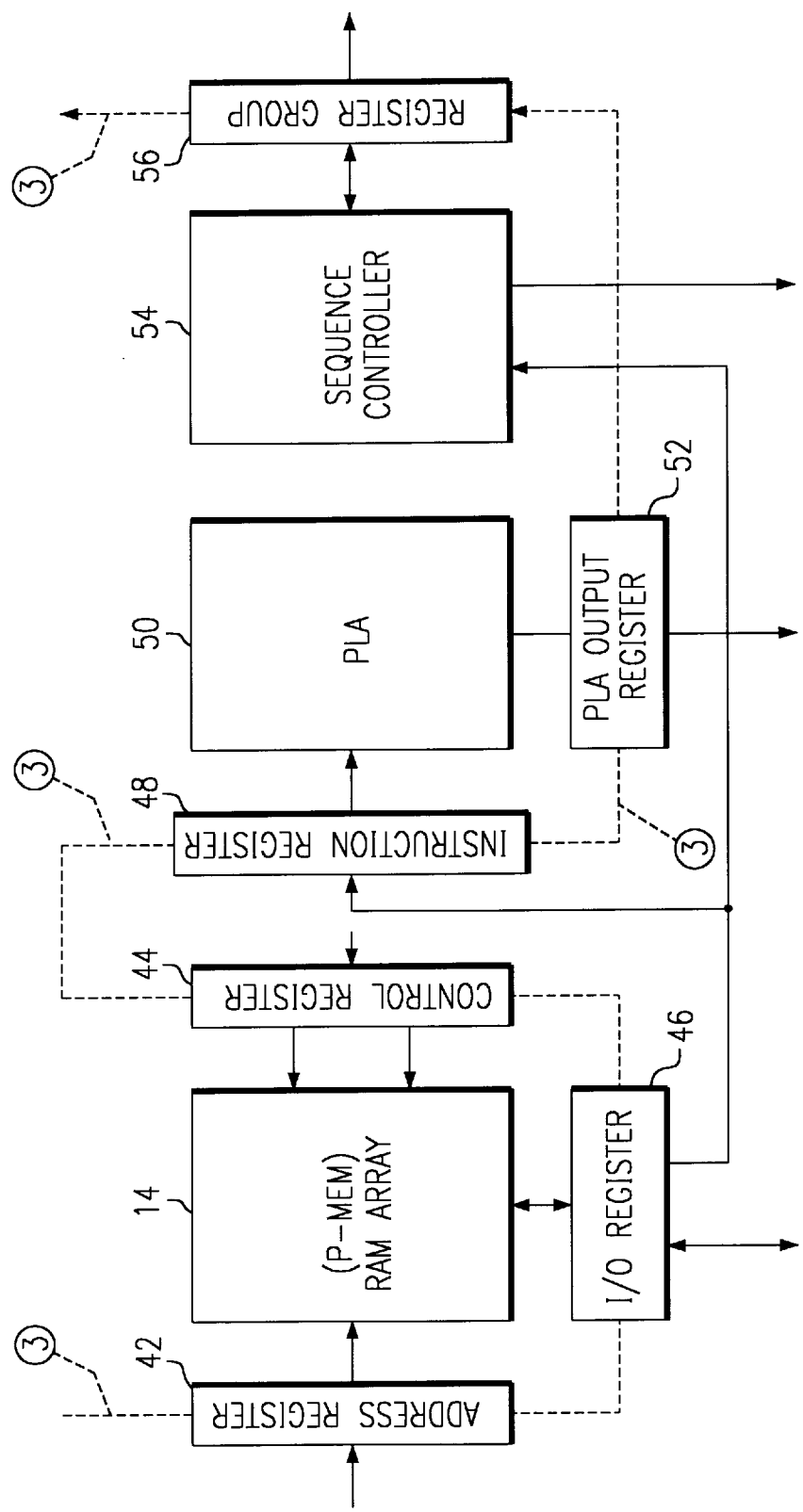
FIG. 2 is a block diagram showing the structure of the program storage section and the control section of a DSP is emulated in an embodiment.
Figure 3:
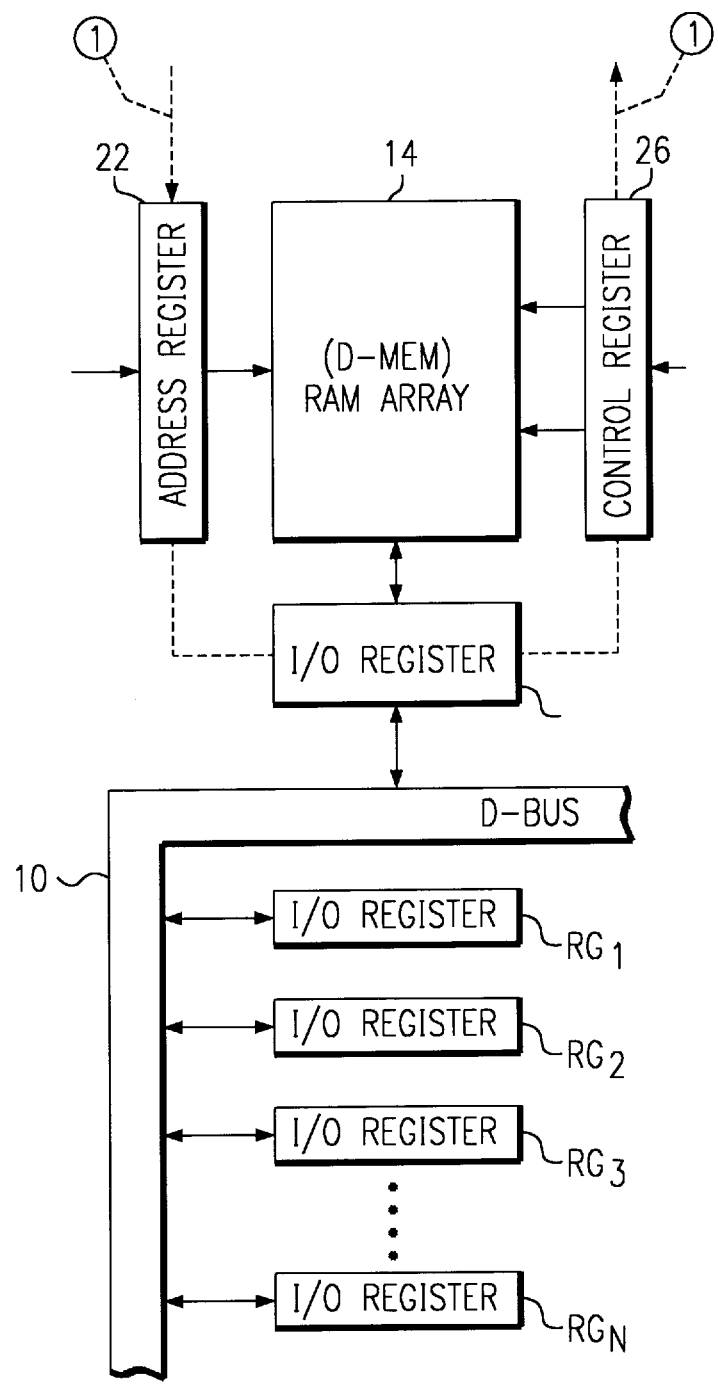
FIG. 3 is a block diagram showing the external I/O registers within a DSP which is emulated in an embodiment.
Figure 4:
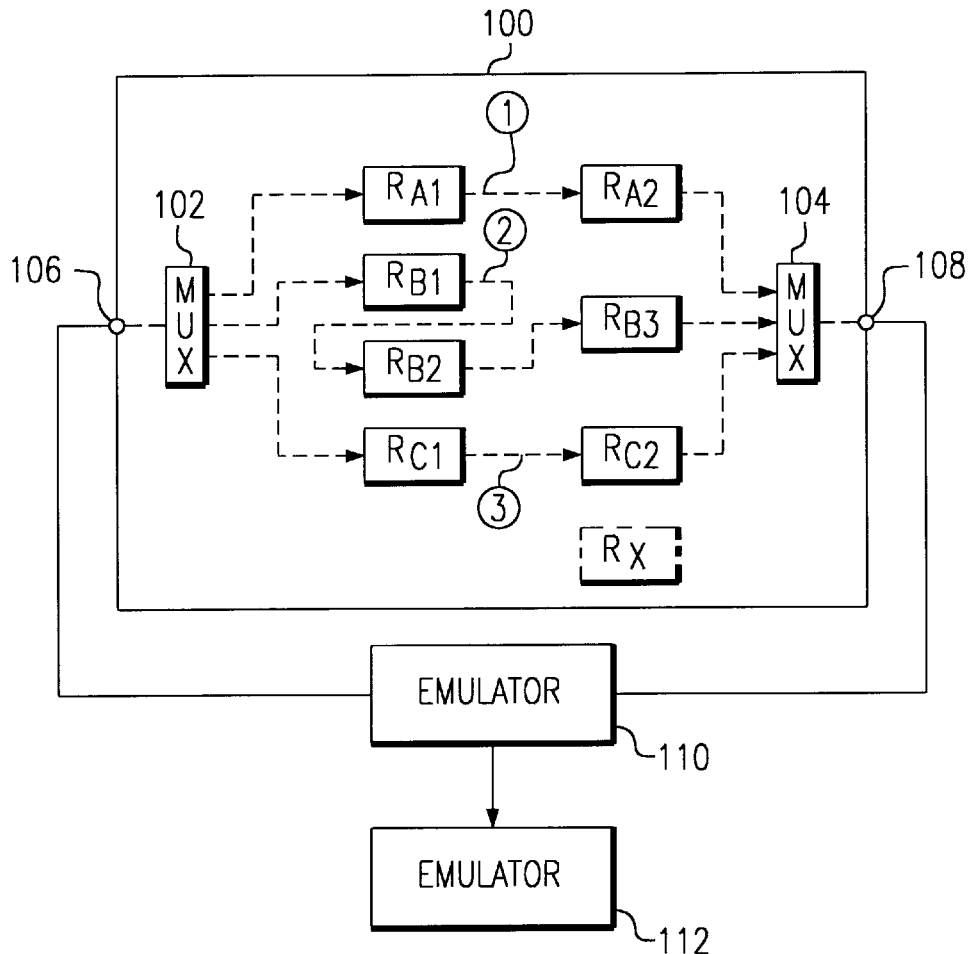
FIG. 4 is a block diagram showing the scanning pass system in the emulation.
Figure 6:
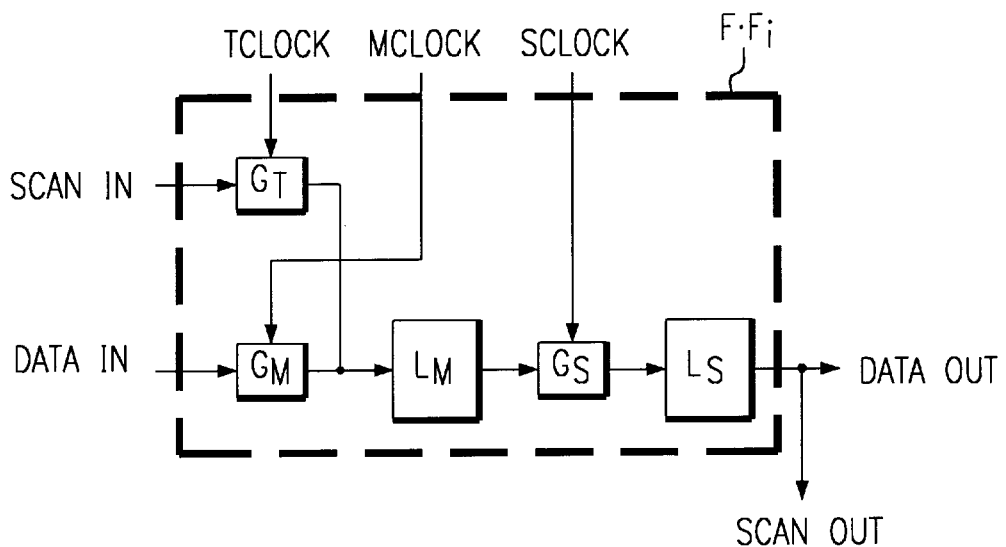
FIG. 6 is a block diagram showing the structure of a master/slave latching circuit (flip-flop) in which serial scanning is possible which constitutes the register in FIG. 5.
Figure 5:
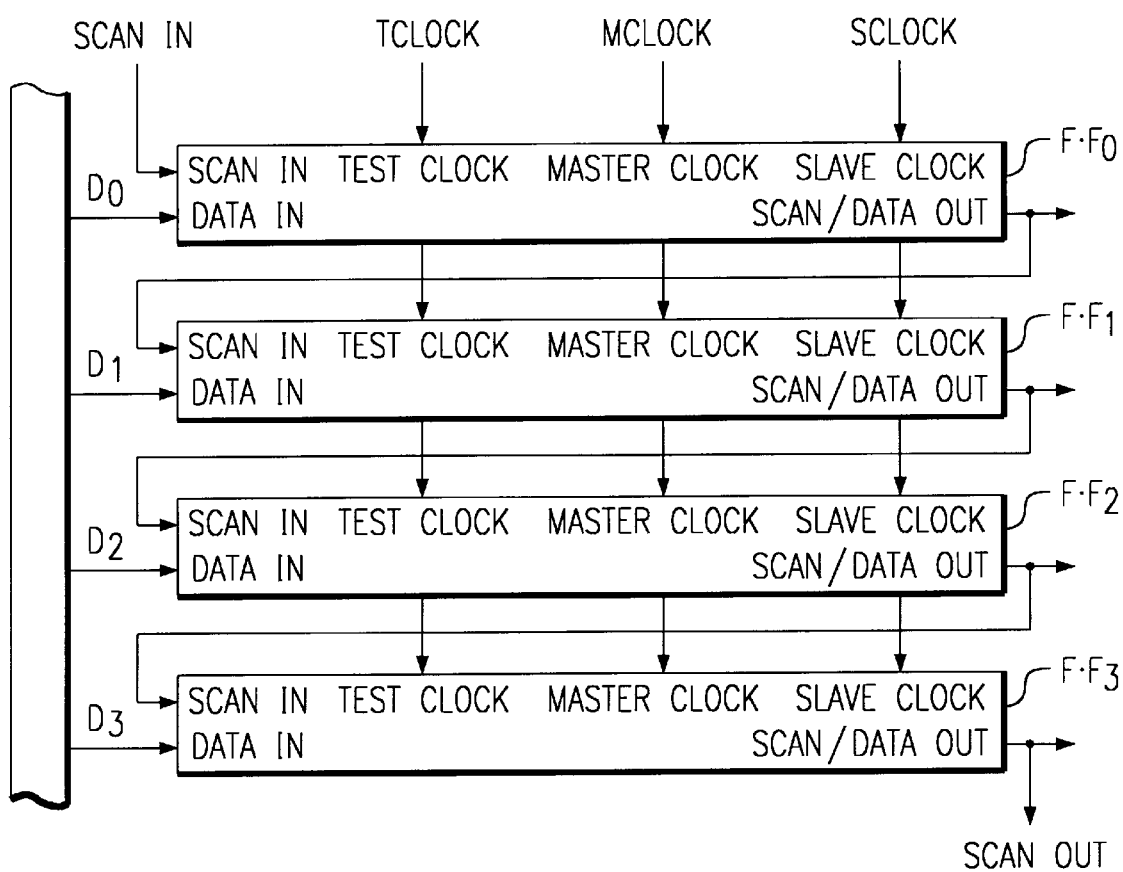
FIG. 5 is a block diagram showing a structural example of a register incorporated in the scanning pass.

An embodiment of the present invention will be explained with reference to FIGS. 1–3. FIGS. 1 and 2 are block diagrams of the main elements of a computer system, for example, a DSP which is emulated in one embodiment of the present invention. FIG. 1 shows the structure of the data storage part and the arithmetic part and FIG. 2 shows the structure of the program storage part and the control part. Even in this embodiment, the DSP is connected to emulator 110 as the target system as shown in FIG. 4.

In FIG. 1, the DSP is provided with two mutually independent data buses D-BUS 10, C-BUS 12 and to these buses, data memory D-MEM 14, coefficient memory C-MEM 16, arithmetic logic unit ALU 18, and multiplier-adder computer MAC 20 are connected as shown. D-MEM 14 and C-MEM 16 are composed of, for example, RAM (static random-access memory). D-MEM 14 stores the data used for sum-of-products computation and other computations and the data for the computational results. C-MEM 16 stores the coefficient data for sum-of-products computation.

Address registers 22 and 24, control registers 26 and 28, and I/O registers 30 and 32 are connected to D-MEM 14 and C-MEM 16. Address information for addressing during memory access (writing, reading) is stored in address registers 22 and 24. Control signals (e.g., write signals, read signals, etc.) during memory access are stored in control registers 26 and 28. Data written to or read from respective memories D-MEM 14, C-MEM 16 is stored in I/O registers 30 and 32. I/O register 30 of D-MEM 14 is connected to D-BUS 10, and I/O register 32 of C-MEM 16 is connected to C-BUS 12.

Address registers 22 and 24, control registers 26 and 28, and I/O registers 30 and 32 surrounding the D-MEM 14 and C-MEM 16 are configured as a master/slave latch circuit which can be sequentially scanned and are connected in series during one scanning pass (1) (referred to as (1) for the sake of explanation) as indicated by the dotted line.

ALU 18 executes arbitrary arithmetic and logical computations and has an integrated accumulator ALU-ACC 18a. MAC 20 a dedicated unit for executing sum-of-products computation and is includes an integrated multiplier (not shown) and accumulator MAC-ACC 20a. Two units ALU 18, MAC 20 are thus provided so that parallel processing of, for example, convolution in MAC 20 and additions in ALU 18 is possible.

Accumulators ALU-ACC 18a and MAC-ACC 20a respectively integrated in ALU 18 and MAC 20 also have a register structure composed of master/slave latching circuit in which serial scanning is possible and are mutually connected in series during the same scanning pass (2) (referred to as (2) for the sake of the explanation) as indicated by the dotted line.

In FIG. 2, program memory P-MEM 40 of this DSP is composed of, for example, a SRAM, to which address register 42, control register 44, and I/O register 46 are connected. Address information for addressing during memory access (writing, reading), is stored in address register 42. Control signals (e.g., write signals W, read signals R, etc.) for memory access are stored in control register 44. Data written in P-MEM 40 and data read from P-MEM 40 are stored in I/O register 46.

In this DSP, the program is stored in P-MEM 40 by downloading from the host controller (not shown) via interface circuit (not shown), C-BUS 12, and program memory I/O register 46.

The instruction code read to program memory I/O register 46 from P-MEM 4 in the instruction fetch cycle is provided to instruction register 48 and sequence controller 54. PLA 50 decodes the instruction code loaded in instruction register 48, outputs one set of control signals corresponding to the instruction to PLA output register 52, and transmits each control signal to the necessary register and gate in each part.

Whereas PLA 50 mainly handles arithmetic calculations and logic and transfer instruction, sequence controller 54 handles jump instruction, subroutine instruction, etc. Sequence controller 54 also transmits control signals corresponding to the instructions to the necessary register and latches in each part when the instruction it handles is decoded (identified). Multiple registers 56 (in FIG. 2, indicated as one register group) for repeat counter and for control status are connected to sequence controller 54.

Address register 42, control register 44, I/O register 46, instruction register 48, PLA output register 52, and register group 56 surrounding the P-MEM 40, PLA 50, and sequence controller 54 have a register configuration composed of master/slave latching circuit in which serial scanning is possible and are mutually connected in series during one scanning pass (3) (referred to as (3) for the sake of explanation) as indicated by the dotted line.

As noted above, the registers belonging to the main part, namely, the core of the DSP, as is shown in FIGS. 1 and 2, are included in one of the scanning passes in the basic design stage by the manufacturer.

Various I/O registers are provided outside the core, for example, interface circuit, etc. For example, in the case of an audio DSP, host interface circuit for exchanging data between the host controller and the program, audio interface circuit and external memory input/output interface circuit for exchanging data between the external digital audio circuit and external auxiliary memory, etc., are formed as system elements and I/O registers connected to internal bus (D-BUS 10, C-BUS in this embodiment) are included in the interface.

If the I/O registers have the necessary function by custom design, and moreover, become the monitoring target of the emulation, the register contents are read by the emulator 110 during emulation.

I/O registers RG1, RG2, . . . RGn outside the core which becomes the monitoring target during emulation of the DSP of the embodiment are shown together.

These I/O registers RG1, RG2, . . . RGn external to the core are made so that the register name (e.g., 101, 102, . . . 10n) is specified by the program instruction and to write to or read data from it by mapping in the I/O space. For example, IN/OUT instruction which can transfer data back-and-forth between D-MEM (data memory) 14 within the core and each external I/O register RGi (i=1, 2, . . . , n) is defined.

For example, the instruction "IN 10i, D(dma)" in assembly language is an instruction which means "transfer the contents of external I/O register RGi to the memory address in D-MEM 14 specified by the direct memory address (dma)." Also, the instruction "OUT D (dma), 10i" means "transfer the contents of memory address in D-MEM 14 by the direct memory address (dma) to external I/O register RGi."

When this type of IN/OUT instruction is executed, the data is held temporarily in data memory I/O register 30 and then transmitted to the transfer destination. That is, in the case of the IN instruction, data transmitted from external I/O register RGi of transfer origin via D-BUS 10 is loaded in data memory I/O register 30 and is written in the memory address of the transfer destination within D-MEM 10 from the register 30. In the case of the OUT instruction, data read from the memory address of the transfer origin within D-MEM 10 is loaded in register 30 and then transmitted to external I/O register RGi of the transfer destination from register 30 via D-BUS 10.

In the DSP of the embodiment, in addition to the instruction set defined conventionally, IN'/OUT' instruction which can mutually transfer data between new data memory I/O register 30 and each external I/O register RGi (i=1, 2, . . . , n) is defined.

For example, the instruction "IN'10i, D(dma)" means "transfer the contents of external I/O register RGi to data memory I/O register 30." With this IN' instruction, there is no particular meaning to direct memory address information (dma) and any given value is possible. Also, instruction "OUT' D(dma), 10i" means "transfer the contents of data memory I/O register 30 to external I/O register RGi." Even in the OUT' instruction, there is no particular meaning to direct memory address information (dma) and any given value is possible.

In accordance with the fact that the IN'/OUT' instruction was defined as explained above, PLA 50 (FIG. 2) is formed to decode the instruction when IN' instruction or OUT' instruction code is loaded in instruction register 48 and to create control signal (namely control signal for executing the necessary data transfer) corresponding to the instruction.

Next, the operation during emulation when the DSP of the embodiment is the target system will be explained.

Break point is set at the prescribed location beforehand in the target program stored in P-MEM 40. When the target program is run in this DSP, it encounters a break point in the middle of the program and stops at this point. At this time, information bearing the status of each part and the system is maintained in each register within the DSP.

Emulator 110 successively selects scanning passes (1), (2), (3), . . . within the DSP, feeds test clock pulse TCLOCK and slave clock pulse SCLOCK to each register (internal register) on the selected scanning pass, and successively reads and latches from the DSP (target system 100) to the emulator side by serially transferring the contents of each register during the scanning pass. Emulator 110 knows ahead of time the order of the internal registers during each scanning pass, separates the serial data latched into each register during each scanning pass, and along with storing the contents (information) of each register into the memory of the emulator at the break point, displays the results on the screen of display 112.

Next, emulator 110 selects scanning pass (3) and by feeding test clock pulse TCLOCK and slave clock pulse SCLOCK to each register during the scanning pass (3), transmits the instruction code "IN'101, D(dma)" to instruction register 48 via scanning pass (3). Then, the IN' instruction "IN'10i, D(dma)" is decoded in PLA 50 and the prescribed control signal is transmitted to each part from PLA 50 via PLA output register 52. Thus, the contents of external I/O register RG1 is transferred to data memory I/O register 30 via D-BUS 10.

Next, emulator 110 selects scanning pass (1), and by feeding test clock pulse TCLOCK and slave clock pulse SCLOCK to each register on the scanning pass (1), reads out the contents (i.e., the contents of external I/O register RG1) of data memory I/O register 30 from the DSP via scanning pass (1), and along with storing the latched register information into internal memory, it is displayed on the screen of display 112.

With regard to the contents of other external I/O registers RG2–RGn, emulator 110 successively executes IN' instruction "IN'102, D(dma)"–"IN' 10n, D(dma)" in the DSP, reads out the register information via D-BUS 10, data memory I/O register 30 during scanning pass (1), and stores the contents in the internal memory and displays the results in the same manner as for external I/O register RG1.

In this way, emulator 110 can read the contents of each of the external I/O registers RG1–RGn not connected during any scanning passes via data memory I/O register 30 during scanning pass (1).

Furthermore, emulator 110 can arbitrarily reload the contents of the external I/O registers RG1–RGn using the OUT' instruction while the target program is suspended. In this case, first of all, the necessary data is transferred to data memory I/O register 30 via scanning pass (1), then instruction code "OUT' D(dma)" is transferred to instruction register 48 during scanning pass (3). Then, the "OUT' D(dma), 10i" is executed within the DSP and the contents (data from emulator 110) of data memory I/O register 30 is transferred to external I/O register RGi via D-BUS 10.

When restarting the target program within the DSP, emulator 110 successively selects scanning passes (1), (2), (3), . . . , transmits the original contents (register contents before the break point) to the registers during all scanning passes by serially scanning similar to what was noted above, then process control is transferred to the target program.

Therefore, according to the embodiment, while the target program is suspended for emulation, emulator 110 can read or reload the contents of external I/O registers RG1–RGn not included during any scanning passes with data memory I/O register 30 connected on scanning pass (1) as the interruption point. Therefore, no matter which external I/O register RG1–RGn is used as the system element in a custom design, modification or addition is not necessary in the scanning pass, and emulator 110 can be executed (monitored) with the same software.

Also, external I/O registers RG1–RGn are not included in the scanning pass, so that it is not necessary for them to be configured as a master/slave type latching circuit in which serial scanning is possible, and parallel input/output type register structure; thus, the circuit design becomes simple.

In the embodiment, data memory I/O register 30 was selected as the break point of the scanning pass with respect to external I/O registers outside the scanning pass, but this is only one example and it is possible to select another internal I/O register, for example, ALU accumulator ALU-ACC 18a, etc. as the break point during the scanning pass.

In the illustrated embodiment, data transfer between internal register (data memory I/O register 30 and external registers RG1–RGn) is executed via D-BUS 10, but it is possible to use C-BUS 12 or any given internal bus for each system. Also, in the illustrated embodiment the computer system which is the target of emulation is a DSP, but the method of the present invention can also be applied to various computer systems other than DSPs.

As explained above, according to the register monitoring method during emulation according to the present invention, by setting a prescribed data transfer instruction between registers belonging to and not belonging to the scanning pass of the computer system and combining the data transfer instruction and scanning pass operation, it is possible to monitor various registers, in particular, various registers not belonging to the scanning passes without changing the software of the emulator, so that the design efficiency of the system can be improved.

I claim:

1. In an integrated circuit having a signal processing core and a peripheral circuit outside said core, said signal processing core having at least a first register within said core, said peripheral circuit having at least a second register outside said core; a method of monitoring registers during emulation utilizing an emulator for said core without modification for said peripheral circuit comprising the steps of:

suspending operation of a program in said signal processing core;

connecting said first register within said core for series transfer of data to an emulator during a scanning pass;

transferring data during a test of said integrated circuit from said second register outside said core to said first register within said core bv a register to register transfer in parallel across a bus; and subsequently scanning said first register whereby the contents of the second register are read by said emulator.

2. The method of claim 1 further comprising the steps of:

connecting an instruction register, for providing instructions to a program execution controlling circuit, to one of the scanning passes, and enabling the emulator to provide the first or second data transfer instruction to the instruction register via the scanning pass.

3. In an integrated circuit having a signal processing core and a peripheral circuit outside said core, said signal processing core having at least a first register within said core, said peripheral circuit having at least a second register outside said core; a method of monitoring registers during emulation utilizing an emulator for said core without modification for said peripheral circuit comprising the steps of:

suspending operation of a program in said signal processing core;

connecting said first register within said core for series transfer of data from an emulator to said first register within said core during a scanning pass; and transferring data during a test of said integrated circuit from said first register within said core to said second register outside said core by a register to register transfer in parallel across a bus; and whereby data from said emulator is loaded into said second register.

* * * * *